United States Patent
Bethge

[11] Patent Number: 5,090,182
[45] Date of Patent: Feb. 25, 1992

[54] ROUND BALE PRESS FOR AGRICULTURAL PRODUCTS

[75] Inventor: Jörg Bethge, Harsewinkel, Fed. Rep. of Germany

[73] Assignee: Claas Ohg, Harsewinkel, Fed. Rep. of Germany

[21] Appl. No.: 621,263

[22] Filed: Dec. 3, 1990

[30] Foreign Application Priority Data

Dec. 2, 1989 [DE] Fed. Rep. of Germany ....... 3940012

[51] Int. Cl.⁵ ............................................ B65B 11/04
[52] U.S. Cl. ........................................ 53/556; 53/587; 53/389.4
[58] Field of Search .................. 53/118, 389.4, 556, 53/587, 588; 264/290.2

[56] References Cited

U.S. PATENT DOCUMENTS

| | | | |
|---|---|---|---|
| 2,597,041 | 5/1952 | Stokes | 53/556 X |
| 2,626,422 | 1/1953 | Lammertse | 264/290.2 |
| 3,409,988 | 11/1968 | Zelnick | 264/290.2 |
| 3,444,585 | 5/1969 | Watanabe | 264/290.2 |
| 4,691,503 | 9/1987 | Frerich | 53/587 |
| 4,729,213 | 3/1988 | Raes | 53/587 X |
| 5,003,752 | 4/1991 | Matsumoto | 53/556 |

FOREIGN PATENT DOCUMENTS 343453 11/1989 European Pat. Off.
3815955 11/1989 Fed. Rep. of Germany ........ 53/587

Primary Examiner—John Sipos
Attorney, Agent, or Firm—Michael J. Striker

[57] ABSTRACT

A round bale press comprises a unit forming a winding chamber having a product supply opening, a wrapping material supply unit for supplying a material for wrapping a finished bale, a wrapping material pulling unit for pulling the wrapping material of a predetermined length from the wrapping material supply unit and supplying the wrapping material into the winding chamber for wrapping the finished bale, a width stretching unit for stretching the pulled wrapping material before entering the winding chamber. The width stretching unit is arranged transversely to the longitudinal axis of the press and has a width corresponding at least to a width of a bale to be wrapped. The width stretching unit includes a guiding surface operable for changing the wrapping material from a straight position to a non-straight, roof-shaped position.

8 Claims, 3 Drawing Sheets

ROUND BALE PRESS FOR AGRICULTURAL PRODUCTS

BACKGROUND OF THE INVENTION

The present invention relates generally to a round bale press for agricultural products.

More particularly, it relates to such a round bale press which has a winding chopper with a product supply opening, and a wrapping material pulling roller pair for pulling a wrapping material web of a predetermined length from a wrapping material supply container and supplying the web into the winding chamber to wrap the finished bale. Also, a cutting device is associated with the pulling roller and a braking device is associated with the wrapping material roll while a width-stretching device is located before the entrance to the binding chamber.

Baling presses of the above mentioned general type are known in the art. One of such round baling presses is disclosed in European Patent Application 0,225,398. In this document a net web for wrapping a bale in its finished shape is guided by a pulling roller pair through the product supply opening into the bale pressing chamber. After forming of the bale and the stopping of the product supply, the pulling rollers are turned on and the net web is guided through the product supply opening to the rotatable bale. The bale engages the initial portion of the net web and pulls the net web. Thereby a tension is built in the net web between the pulling roller pair and the bale so as to tightly wrap the bale. However, this tensioning reduces the width of the net web or in other words, constricts the net web. As a result, both end regions of the bale are not wrapped with the net web. For avoiding this phenomenon, the roller is provided between the pulling roller pair and the bale and then the roller is turned to the web of the wrapping material and driven in rotation by the same. The roller is provided with oppositely running thread convolutions extending from each center outwardly. Therefore the net web is tensioned to the required width, and the bales are wrapped over their whole width. Since the relative movements of the net web and of the roller driven by the net web are identical, the transverse action of the web convolutions onto the wrapping material web is hardly noticeable. For the desired transverse stretching only a small path of the wrapping web is available from the reason of space so that additional expensive guiding means cannot be provided and the desired action can be obtained only with simplest possible means.

SUMMARY OF THE INVENTION

Accordingly, it is an object of the present invention to provide a round bale press which avoids the disadvantages of the prior art.

More particularly, it is an object of the present invention to provide a round bale press in which the transverse stretching of the wrapping web is performed in a sufficient manner and means required for the stretching can be arranged without taking up expensive space.

In keeping with these objects and with others which will become apparent hereinafter, one feature of the present invention resides, briefly stated, in a round baling press in which the width stretching device is arranged transversely to a longitudinal axis of the machine and has at least a width corresponding to a width of the bale to be wrapped and the width stretching means includes a preferably bracket-like guiding surface operative for changing the wrapping web from its straight position to a non-straight, roof-shaped position.

In accordance with an advantageous feature of the present invention, the width stretching device is located in the region between the brake binding material roller and the binding material pulling roller pair.

The pulling roller pair guides the net web into the bale chamber through a gap located far from the product supply opening and arranged directly in the region of the gap. As a result, the web stretching device is no longer arranged in the region of the round bale press, in which dirt and dust generated, namely in the product supply region.

Another advantage of the present invention is that the web stretching device must not change its position, in contrast to the web stretching device disclosed in the European Application 0,225,398. In this Patent Application measures must be taken to enable reciprocating turning of the web stretching roller in the region of the product supply opening.

It is another advantageous feature of the present invention that the width stretching device is formed as a guiding shoulder formed so that the tensioned wrapping material web is guided over the guiding shoulder and the web is deviated, from its side edges starting, from the web supply plane.

The guiding shoulder can be formed in various ways. The guiding shoulder can be formed as a convexly curved stretching bracket, as an angled stretching bracket, as a once-angled stretching bracket.

On the other hand, it can also be formed as a roller which has a central part and two end parts, with the end parts having a smaller diameter than the central part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
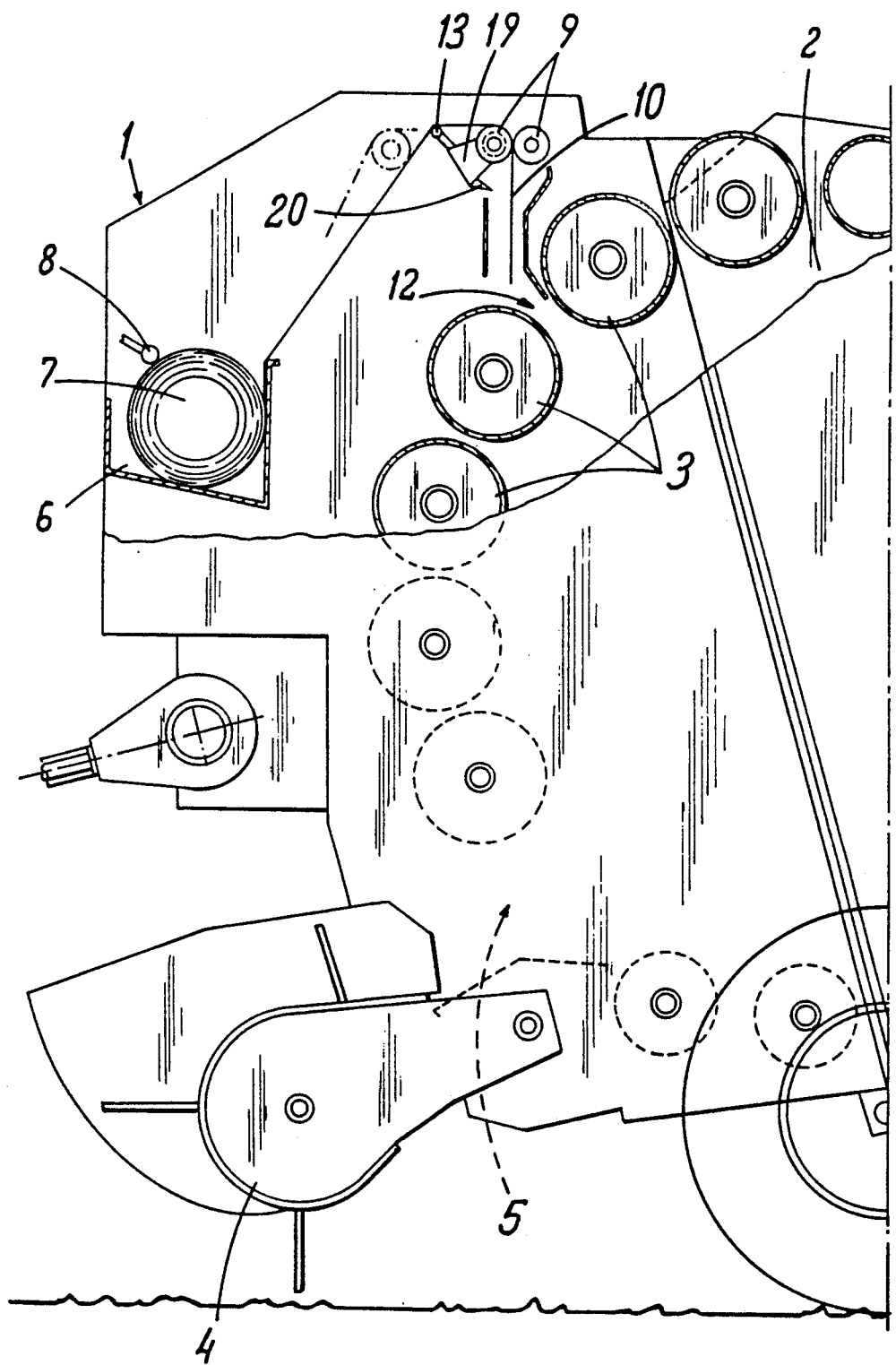
FIG. 1 is a view showing a front part of a bale press on a side view in accordance with the present invention.

A front part of a round bale press is identified as a whole with reference numeral 1. It has a pressure chamber 2 which is peripherally limited by a plurality of driven winding rollers 3. An agricultural product is transported in a known manner by a supply device 4 through a supply opening 5 into the pressure chamber 2.

Figure 2:
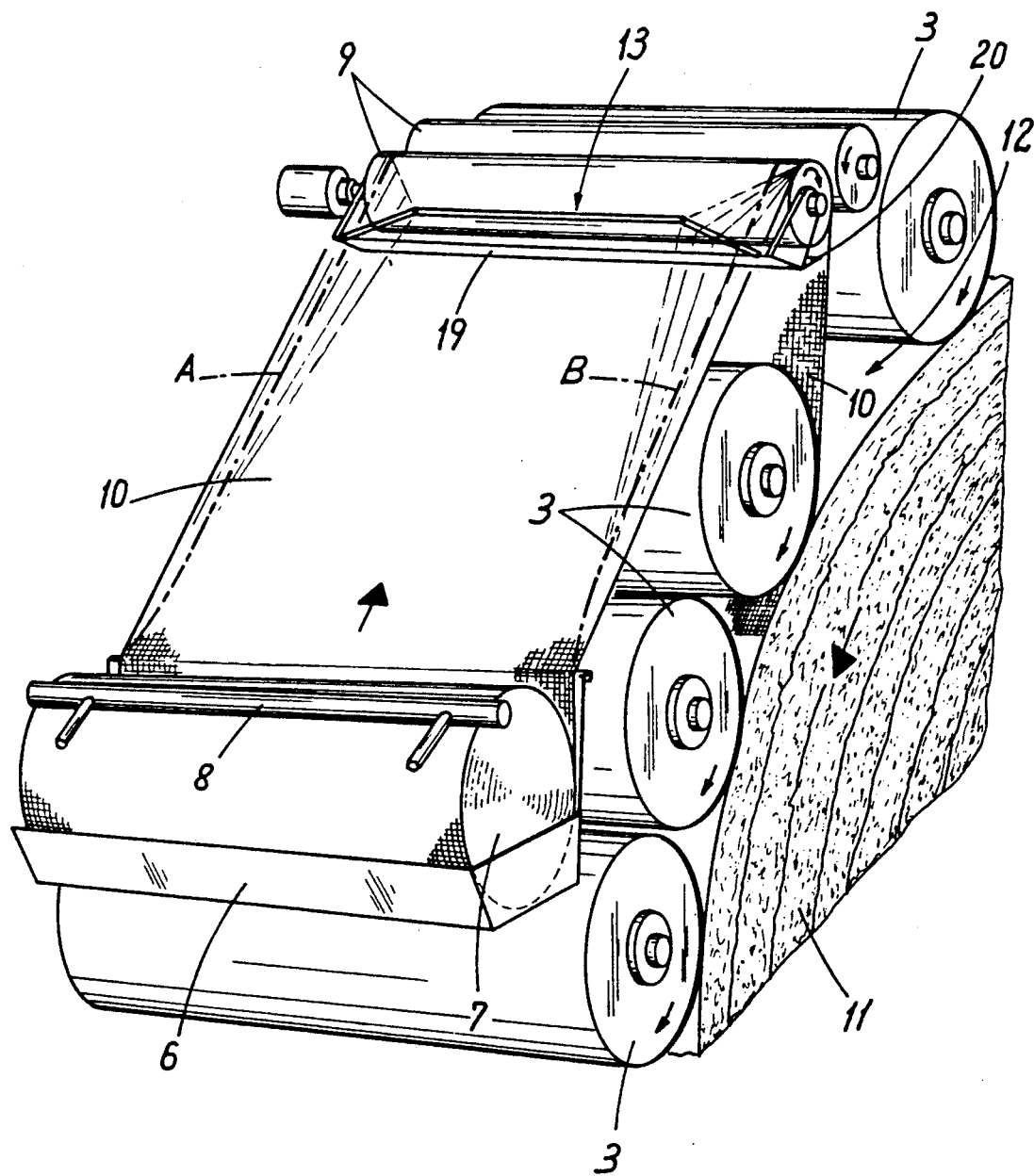
FIG. 2 is a view showing a region of a net web pulling device of the round bale press in accordance with the present invention, in perspective.

As can be seen from FIG. 2, a supply container 6 is provided in the upper region of the round bale press 1. The net roller 7 is supported in the supply container 6. A known braking arm 8 rests on the net roller 7 so as to brake the roller. A web 10 is pulled from the net roller 7 by a pair of pulling rollers 9 and guided through a gap between two neighboring winding rollers 3 into the pressure chamber to be applied to the outer surface of the finished bale 11.

A turnable cutter 20 separates the net web after a sufficient wrapping of the bale. Since the pair of the pulling rollers 9 is arranged directly above the inlet gap 20, the distance between the pulling roller pair and the outer surface of the bale 11 is very small. Therefore no danger of the constriction of the net web 10 occurs in this region. This danger, however, exists in the region between the net roller 7 and the pulling roller pair 9.

Figure 3:
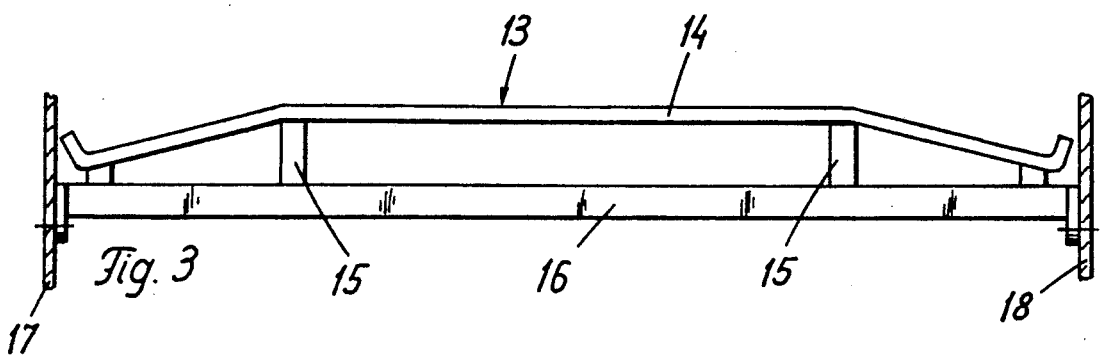
FIGS. 3-6 are views showing several embodiments of a web stretching device in accordance with the present invention.

For avoiding the constriction a guiding shoulder 11 is provided shortly before the pulling roller pair 9 as can be clearly seen from FIG. 3. FIG. 3 shows that the guiding shoulder includes a trapezoidally angled bracket 14 which is fixedly connected with a holder 16 by supports 15. The holder 16 is adjustably supported at its ends between side walls 17 and 18 of the machine. In the embodiment shown in FIG. 2, the back 19 of the separating cutter 20 serves as a holder for the bracket 14 and is cyclically turned with the same. In FIG. 2 the course of the net web 10 is shown by two thick dash-dot lines A and B when no web stretching device was provided.

The net web 10 is delivered smaller in the pulling roller pair 9 than it is pulled from the material roller 7. The width stretching device guarantees that the net web 10 runs with the whole width in the pulling roller pair 9 in which it is unwound from the material roller 7. Therefore there is no longer the danger that the bale 11 is not covered with a net web in its edge regions.

Figure 4:
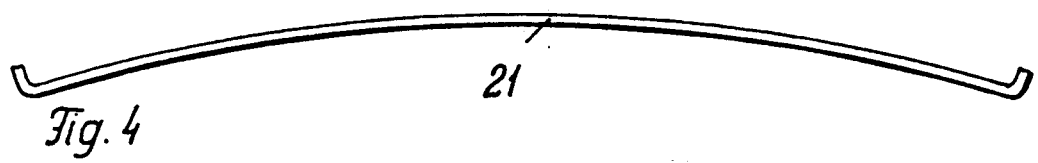
Figure 5:
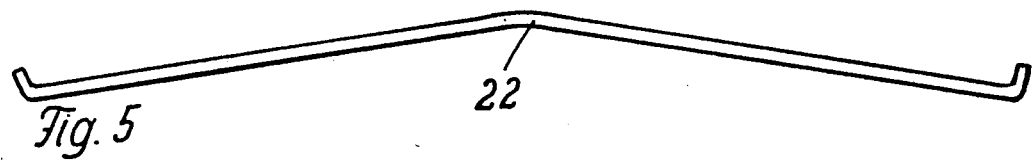
Figure 6:
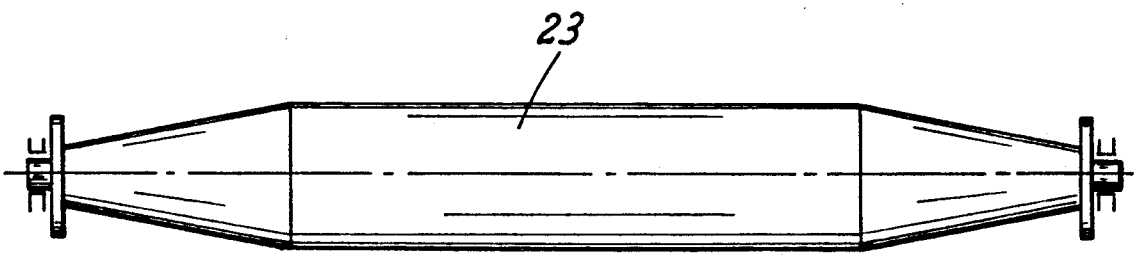

As can be seen from FIG. 4, instead of a trapezoidally bent bracket 14, a convexly bent bracket 21 can be used as well. Contrary to FIG. 4, the bracket shown in FIG. 5 is formed as a bracket 22 which has one angled portion in its center. FIG. 6 shows an embodiment in which the width stretching device 13 can be formed as a roller 34 which extends outwardly conically at its ends.

It will be understood that each of the elements described above, or two or more together, may also find a useful application in other types of constructions differing from the types described above.

While the invention has been illustrated and described as embodied in a round bale press, it is not intended to be limited to the details shown, since various modifications and structural changes may be made without departing in any way from the spirit of the present invention.

Without further analysis, the foregoing will so can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A round bale press, comprising means forming a winding chamber having a product supply opening and a gap spaced from said product supply opening; wrapping material supply means for supplying a material for wrapping a finished bale through said gap and including a braked material supply roller; wrapping material pulling means comprising of a pair of pulling rollers for pulling the wrapping material of a predetermined length from said wrapping material supply means and supplying the wrapping material into said winding chamber through said gap for wrapping the finished bale; said pair of pulling rollers being arranged directly in the region of said gap and having a nip therebetween facing the bale width stretching means for stretching the pulled wrapping material before entering the winding chamber, said width stretching means being arranged transversely to the longitudinal axis of the press and having a width corresponding at least to a width of a bale to be wrapped, said width stretching means being arranged between said braked material supply roller and said pair of pulling rollers, said pair of pulling rollers guiding the wrapping material through the nip directly into said gap which is spaced from said product supply opening of said winding chamber, said width stretching means being formed as a stationary guiding shoulder operable for guiding the wrapping material in stretched condition and deviating the wrapping material from a web supply plane starting from its web edges.

2. A round bale press as defined in claim 1; and further comprising cutting means for cutting the wrapping material associated with said wrapping material pulling means.

3. A round bale press as defined in claim 1; and further comprising braking means associated with said material supplying means and operative for braking said roller of said wrapping material supplying means.

4. A round bale press as defined in claim 1; wherein said wrapping material supply means includes a wrapping material accommodating container.

5. A round bale press as defined in claim 4, wherein said roller of said wrapping material supplying means is located in said container.

6. A round bale press as defined in claim 1, wherein said guiding shoulder is formed as a convexly curved stretching bracket.

7. A round bale press as defined in claim 1, wherein said guiding shoulder is formed as an angled stretching bracket.

8. A round bale press as defined in claim 1, wherein said guiding shoulder is formed as once angled stretching bracket.

* * * * *